(12) United States Patent
Stumpf et al.

(10) Patent No.: US 11,073,176 B2
(45) Date of Patent: Jul. 27, 2021

(54) FASTENING ELEMENT

(71) Applicant: BÖLLHOFF VERBINDUNGSTECHNIK GmbH, Bielefeld (DE)

(72) Inventors: Michael Stumpf, Bielefeld (DE); Franz Drüke, Detmold (DE); Jörg Matthes, Herford (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 429 days.

(21) Appl. No.: 16/090,286

(22) PCT Filed: Mar. 17, 2017

(86) PCT No.: PCT/EP2017/056407
§ 371 (c)(1),
(2) Date: Oct. 1, 2018

(87) PCT Pub. No.: WO2017/167590
PCT Pub. Date: Oct. 5, 2017

(65) Prior Publication Data
US 2019/0113067 A1    Apr. 18, 2019

(30) Foreign Application Priority Data
Mar. 30, 2016  (DE) ............... 10 2016 105 794.0

(51) Int. Cl.
*F16B 37/04*    (2006.01)
*F16B 11/00*    (2006.01)

(52) U.S. Cl.
CPC .......... *F16B 37/044* (2013.01); *F16B 11/006* (2013.01)

(58) Field of Classification Search
CPC ..... F16B 11/006; F16B 37/044; F16B 37/048
(Continued)

(56) References Cited

U.S. PATENT DOCUMENTS 3,226,140 A * 12/1965 Voegeli ................ F16B 35/06
403/272
3,461,937 A * 8/1969 Finney ................ F16B 37/044
411/111
(Continued)

FOREIGN PATENT DOCUMENTS

| CN | 203685816 U | 7/2014 |
| DE | 729521 C | 12/1942 |

(Continued)

OTHER PUBLICATIONS

English translation of the International Preliminary Report on Patentability for PCT/EP2017/056407 dated Oct. 2, 2018, (6 pages).
(Continued)

*Primary Examiner* — Flemming Saether
(74) *Attorney, Agent, or Firm* — Reising Ethington P.C.; Matthew J. Schmidt

(57) ABSTRACT

A fastening element consisting of a cage element with a nut arranged therein that is held by a fastening flange in the cage element. The cage element has a wall element which can be moved in an axial direction and shields the seat area of the cage element against the penetration of adhesive while mounting the fastening element on a component surface.

19 Claims, 9 Drawing Sheets

(58) Field of Classification Search
USPC .................. 411/103, 105, 82, 82.1, 82.3
See application file for complete search history.

(56) References Cited

U.S. PATENT DOCUMENTS

| | | | | |
|---|---|---|---|---|
| 3,646,982 A * | 3/1972 | Cushman | .............. | F16B 33/004 411/82.5 |
| 3,716,092 A * | 2/1973 | Serewicz | ................. | F16B 5/01 411/82.5 |
| 4,863,327 A * | 9/1989 | Poupiter | ............... | F16B 37/044 411/112 |
| 4,895,484 A * | 1/1990 | Wilcox | ................. | F16B 37/044 411/103 |
| 5,013,391 A * | 5/1991 | Hutter, III | ......... | B05C 17/00503 156/578 |
| 6,773,780 B2 * | 8/2004 | Hutter, III | ............. | F16B 5/0208 403/267 |
| 9,441,660 B2 * | 9/2016 | Meyers | ..................... | F16B 5/01 |
| 2009/0129885 A1 * | 5/2009 | Csik | ..................... | F16B 37/046 411/103 |
| 2015/0204362 A1 | 7/2015 | Burd | | |
| 2016/0076577 A1 * | 3/2016 | Rizzello | ................ | F16B 11/006 411/82 |

FOREIGN PATENT DOCUMENTS

| | | |
|---|---|---|
| DE | 202013001061 U1 | 3/2013 |
| EP | 0744555 A1 | 11/1996 |
| EP | 0758057 B1 | 1/2003 |
| EP | 1468196 B1 | 10/2008 |
| WO | WO2004040150 A1 | 5/2004 |
| WO | NO2007076267 A2 | 7/2007 |
| WO | WO2008157265 A1 | 12/2008 |
| WO | WO2009064818 A1 | 5/2009 |

OTHER PUBLICATIONS

CN Office Action for CN Application No. 201780022193.2 dated Feb. 25, 2020 (8 pages).
Written Opinion & International Search Report for PCT/EP2017/056407 dated Jun. 14, 2017, 12 pages.

* cited by examiner

FASTENING ELEMENT

1. TECHNICAL FIELD

The present disclosure relates to a fastening element with a cage element, in particular a cage nut, in order to fasten a connecting element to a component surface. Moreover, the present disclosure relates to a component with such a fastening element, as well as a corresponding installation and manufacturing method for this fastening element.

2. BACKGROUND

A generally known problem in the prior art is to fasten a connecting element such as a nut to a component surface. This problem occurs for example when a screw cannot be directly fastened in a component. Another situation relates to a component that is only accessible on one side so that a connecting element must already be arranged in a secure or floating manner on the inaccessible component side. Due to these technical requirements, various designs have been developed for the floating arrangement of connecting elements on a component surface.

In this context, EP 1 468 196 B1 describes a nut with a plate-like fastening flange that is securely clamped in a U-profile in a floating manner with the assistance of a spring element. This U-profile possesses an opening in its base that is oriented toward a component opening. The opposing legs of the U-profile extend vertically upward on the side of this opening to provide opposing fastening openings for a form-fit fastening of the connecting element. The opening in the U-profile is equipped with a collar which is inserted into the opening in the component. This collar is deformed within the component opening such that a friction-locked connection arises between the U-profile and component opening. In this manner, the floatingly arranged nut is arranged directly adjacent to the component opening.

Since the collar of the opening in the U-profile is deformed in the component opening, or respectively pressed into it, high mechanical loads on the component arise in this region. Therefore, this type of fastening is unsuitable for brittle or thin components. This type of fastening initiates damaging crack growth in the component in the surroundings of the component opening. Moreover, it is necessary for the component to be accessible on both sides of the component opening. Whereas the fastening element is arranged on the component surface from one side of the component, the fastening element is fastened from the opposite side of the component. This required two-sided accessibility restricts the possible application of the fastening element disclosed here.

EP 0 758 057 B1 describes a fastening element that is fastened to a component both mechanically by a friction-locked connection, as well as chemically by an adhesive connection. To this end, a combination consisting of a nut with a plate-like flange and a lining sleeve for the component opening is fastened to a component opening with the assistance of a retaining housing. Whereas the lining sleeve extends into the component opening and is later pressed, or respectively riveted at this location, the retaining housing is fastened adhesively to the component surface by means of the combination consisting of the nut and lining sleeve. Since the nut is fastened in a floating manner in the retaining housing by means of its plate-like flange, a combined adhesive and mechanical fastening of the fastening element thus exists. The installation of this fastening element also requires two-sided accessibility of the component. The retaining housing is adhered to one side of the component, whereas the lining sleeve is pressed into the component opening from the other side of the component. Moreover, mechanical loads arise right at the edge of the component opening with this type of fastening as well. A further disadvantage is the relatively high installation effort for the fastening element. Both mechanically pressing in the lining sleeve into the component opening as well as adhering the retaining housing above the connecting element require a plurality of installation steps that need to be coordinated. Therefore, both the structural design of the fastening element as well as the installation method for the fastening element involve high efforts and are time-consuming.

WO 2007/076267 also describes a fastening element that can only be installed in component openings accessible on two sides. In comparison to the above-described fastening elements, in this case only the U-shaped base element is adhesively positioned on the component surface, however. Accordingly, the technical solution described here reduces the mechanical load on the component right at the edge of the component opening. This makes it possible to install the fastening element described here on thinner components as well. However, the U-shaped design of the base element on which the nut is floatingly fastened with a plate-shaped flange represents a design that is less aesthetically appealing and is sensitive to contamination. At the same time, this design makes it possible for the connecting element with the plate-shaped flange to be exchangeable without removing the U-shaped base element from the component surface. In this context, it is only cumbersome that the connecting spring ring, or respectively a similar spring design holding the connecting element must be removed from the U-shaped base part with a correspondingly high exertion of force. Only then can the connecting element be exchanged. This is only possible with the assistance of tools and sufficient mechanical force. In this context, it is possible for the U-shaped base element to loosen from the exertion of force or even be completely released from the component surface.

DE 729 521 describes a fastening element with a similar design. In this case as well, a nut with a plate-like fastening flange is arranged in a form-fit on a U-shaped base element with a central opening. According to one described embodiment, a spring element supports the floating bearing of the connecting element in the U-shaped base part. In order to be able to effectively adhere the U-shaped base part to a component surface, the U-shaped base element is first fastened via a collar to an intermediate adapter. This adapter consists of a flat non-metal component with an opening into which the collar of the opening of the U-shaped base part can be pressed, or respectively arranged in a friction-locked fit. Then the surface of this adapter is adhered to the component surface in alignment with a component opening. Although the installation of this fastening element does not apply significant mechanical loads on the edge of a component opening, the installation method is nonetheless cumbersome and ineffective. First, a mechanical fastening method for the flange must be realized which could be sufficient for arranging the fastening element directly on the component. Moreover, the fastening element with its U-shaped base part and the connecting element floatingly arranged therein is associated with the same disadvantages as already described above.

Proceeding from the above-described prior art, it is therefore the object of at least some embodiments of the present invention to provide an alternative fastening element for the floating arrangement of a connecting element on a component surface. This fastening element should be distinguished by easy installation and a universally employable design.

3. SUMMARY

The above object may be achieved by a cage element for a fastening element, a fastening element in combination with this cage element, by a component with a component opening and a fastening element arranged adjacently thereupon, as well as by a mounting method and production method for the fastening element. Further embodiments and further developments are found in the following description, the accompanying drawings and the attached claims.

The fastening element, in particular a cage nut, may be distinguished by a cage element and a connecting element that, through an installation opening in the second face of the cage element, can be received or seated in the receiving or seat area of the cage element and is held in a floating manner in a form-fit in the receiving or seat area. The cage element for the aforementioned fastening element may be characterized by the following features: a first and a second face arranged opposite each other which are connected to each other by a peripheral boundary wall in order to define a receiving area for the connecting element. In this context, the first face at least partially forms an adhesive surface for fastening the cage element to a component. The second face has the aforementioned installation opening for the connecting element so that the connecting element can be received in the receiving area through the installation opening and held there floatingly in a form-fit manner.

The cage element that forms the fastening element in combination with a connecting element such as a nut with a plate-like fastening flange may be distinguished in comparison to the prior art by another design principle. In contrast to the U-shaped fastening profile of the prior art, the cage element defines an accessible seat area in which the connecting element with a plate-like fastening flange can be inserted, from which it can be removed, in which it can be held in a form-fit, and in which it can be flexibly arranged relative to a component opening given its floating arrangement. For this, the cage element defines a wall-like border arranged around the connecting element that encloses, or respectively confines the seat area for the connecting element in nearly all spatial directions. Although this seat area has an installation opening in the first face; however, the size of the installation opening is adapted to the plate-like fastening flange of the connecting element. Correspondingly, the connecting element can be easily inserted into the seat area through the installation opening, but it is not readily removable therefrom. The radial extension of the installation opening is designed smaller than the lateral extension of the plate-shaped fastening flange of the connecting element. A lateral extension of the fastening flange can be reduced by means of an oblique arrangement of the fastening flange relative to the first face of the cage element. This allows the connecting element with the fastening flange to be inserted, or respectively threaded through the installation opening into the cage element. This procedure may be preferred inter alia when the connecting element comprises a rigid fastening flange that is not designed resilient. In this case, the connecting element or only the fastening flange preferably consists of metal or plastic that is not or negligibly flexible, or respectively resilient corresponding to the material thickness used. In the same manner, or respectively in a kinematic reversal of insertion, it is preferable to remove the connecting element from the cage element in order to exchange it for example with another connecting element.

According to another embodiment, the lateral extension of the fastening flange is only slightly larger than the installation opening. If the fastening flange is placed on the installation opening and it is then pressed through the installation opening, then the fastening flange may snap into the seat area. This snapping-in that is supported by a resilient flexibility of at least one of the ends of the fastening flange arranged radially on the outside can be supported by insertion bevels on the edge of the installation opening. It may be preferred to remove, or snap out, or exchange the connecting element by a reverse movement from the seat area and through the installation opening. An opening provided in the second face which also allows the connecting element to be installed in the seat area is closed by adhering the cage element to a component surface. This seat area on this face is thereby also enclosed so that the connecting element is held therein reliably and floatingly in a form-fit. From this design of the fastening element, it follows that the connecting element is inserted through the installation opening or the opening in the first face into the cage element before the cage element is adhered. Alternatively, it may be preferred to insert the connecting element through the installation opening in the cage element, or to remove it therefrom or exchange it through the installation opening after the cage element is adhered to the component surface.

It may be true that the peripheral boundary wall of the cage element prevents the removal of the cage element from the seat area; however, it simultaneously enables a flexible alignment of the connecting element in the context of the optional movements of the seat area. The alignment options can be flexibly adjusted by appropriately dimensioning the seat area with reference to the plate-like fastening flange. Moreover, it enables more optional alignments than the two diametrically opposed slots known from the prior art.

According to a further embodiment, a wall element is movably arranged in the seat area of the cage element, and is arranged at least partially radially adjacent to the boundary wall.

Whereas the second face of the cage element defines the installation opening, the opposite first face serves to provide an adhesive surface on a component surface fitting for the cage element. Depending on the requirements for the adhesive connection, the size of the adhesive surface preferably extends over different size areas of the first face, or respectively part of this face. Since the first face is, in at least some embodiments, only used in a peripheral edge region as an adhesive surface, an opening is provided in a central region of the first face adjacent thereto. This opening in the first face is oriented toward a component opening so that a connecting means, such as a threaded bolt, can be connected to the connecting element through the component opening.

The aforementioned axially movable wall element is provided so that an adhesive located on the adhesive surface is not displaced into the seat area while the fastening element, or respectively the cage element is being adhered to a component surface. Since this wall element can be moved, or respectively shifted in an axial direction of the cage element, i.e., perpendicular to the adhesive side or first face, it can be arranged on the first side with an edge protruding beyond the adhesive surface. This projecting edge forms a protective collar radially to the inside with respect to the adhesive surface. This protective collar prevents displaced adhesive from penetrating into the seat area. Depending on the design of the wall element and the seal between the wall element and the adhesive surface, a complete or at least partial protection of the seat area from the penetration of adhesive is achieved by means of this construction.

As already mentioned above, the wall element may be movable perpendicular to the adhesive surface between a position that projects axially beyond the first face and a position seated in the seat area. The axially projecting position forms the protective collar to avoid the penetration of adhesive into the seat area. The movable wall element may form a friction-locked fit or frictional connection with the first face or boundary wall. Accordingly, the wall element can be arranged in any desired position projecting beyond the first face. In the same way, the frictional connection makes it possible for the wall element to be moved in the seat area, for example while placing the cage element on the component surface by slight pressure from a fastening machine or a worker on the cage element. By this specific movement of the wall element into the seat area, the adhesive surface of the first face is brought into appropriate alignment, or even into contact with the component surface in order to adhesively fasten the cage element on the component surface. With this movement, the wall element is moved in the same way into the seat area as the adhesive surface of the first face approaches the component surface. Given these opposing, mutually coordinated movements of the wall element and adhesive surface relative to the component surface, the wall element permanently ensures protection against the penetration of adhesive into the seat area.

The first and second face of the cage element are connected to each other by the peripheral boundary wall. The peripheral boundary wall may be arranged on the radial outside of the first and second face. Moreover, the second face may protrude radially inward before it is penetrated by the installation opening. In this way, a seat area arises below the second face in which the plate-like fastening flange of the connecting element can be arranged in a form-fit and simultaneously movable and hence in a specific manner. Moreover, at least one radial bulge may be provided in the seat area by means of which the connecting element can be inserted through the installation opening. This radial bulge opens up an arrangement of the plate-like fastening flange of the connecting element that is laterally moved far enough for the plate-like fastening flange to pass through the installation opening despite its size. This seating position of the connecting element is preferably only achievable by a specific movement of an installation machine or a worker so that the connecting element cannot be removed from the form-fit connection in the seat area during normal operation, or respectively normal use of the fastening element.

The radial bulge in the seat area may be arranged such that the plate-like fastening flange of the connecting element can be seated in the seat area only in this region. Another embodiment of the design and dimensions of the seat area, the boundary wall provides that a diameter which is at least as large as the lateral extension of the fastening flange of the connecting element. Due to this correspondence between the diameter of the seat area and the lateral extension of the fastening flange of the connecting element, the connecting element can be positioned relatively freely in the context of its form-fit retention in the seat area.

According to another embodiment o, the connecting element is a threaded sleeve with an asymmetrical, plate-like end face. This asymmetrical plate-like end face forms the plate-like fastening flange as already mentioned above. In addition to this threaded sleeve, it is also preferable to connect other connecting components to the plate-like fastening flange. This includes for example a sleeve with an inner bayonet lock, a sleeve that provides a frictional connection, a suitable latching connection in combination with the fastening flange, or other commonly used connecting components that can be combined with a plate-like fastening flange.

As already mentioned above, the cage element and thus the fastening element are preferably fastened with the assistance of adhesive to the component surface. According to a further embodiment, the cage element is produced from transparent plastic. This specific material selection makes it possible to fasten the cage element by a light-sensitive adhesive, or respectively by a light-activatable adhesive, to the component surface. In this context, the cage element may be prefixed to the component surface by the effect of light. The cage element is fully fastened by additionally supplying light energy, or by heat, or by waiting, or by another known curing option. It may be preferred to immediately cure the light-sensitive adhesive by a suitable amount of light so that the cage element is fastened within a short time, preferably within a few seconds, to the component surface. Once the cage element is adhered tight to the component surface, the fastening element can be inserted by its plate-like fastening flange into the seat area. Of course, it may be preferred to adhere the cage element with the connecting element already installed therein to the component surface. During this procedure, the axially-movable wall element in its collar-like arrangement protects the seat area from adhesive possibly penetrating into the seat area. In this way, it is also ensured that the plate-like fastening flange of the connecting element is not adhered immovably to the surface.

According to another embodiment, the wall element consists of metal or plastic so that the boundary wall of the cage element is thereby stabilized. In this context, it is also preferred to arrange an additionally stabilizing wall segment adjacent to the boundary wall. This stabilization preferably serves to brace against torque on the connecting element, or respectively the plate-like fastening flange of the connecting element absorbed by the boundary wall without thereby being damaged. This situation is for example conceivable if a screw were to be screwed through a component opening into the threaded sleeve of the fastening element such that the plate-like fastening flange thereby at least partially turns with the screw and is braced against the boundary wall.

According to another embodiment, the adhesive surface has a plurality of projections which serve as spacers to a component surface. These spacers provide a maximum thickness of an adhesive layer between the adhesive surface and component surface. An optimum arrangement of the cage element on the component surface and an optimum adjustment of the thickness of the adhesive layer are thereby achieved. This guarantees reliable fastening of the cage element on the component surface.

In addition to the cage element, the present disclosure also comprises a fastening element, in particular a cage nut in which, according to one of the above-described embodiments, the cage element is used in combination with a connecting element that can be seated in the seat area of the cage element through the installation opening in the second face, or through an opening in the first face, and that is held floatingly in a form-fit manner in the seat area. The floating retention in the seat area may be realized by the component surface when the fastening element is in an adhered state since the component surface closes the seat area on the first face. It may be also preferred to provide detent lugs that protrude radially inward into the seat area and hold the connecting element in the seat area.

The present disclosure further comprises a component with a component opening, adjacent to which the above-described cage element or the above-described fastening element is adhered to the component surface.

To this end, the present disclosure describes a method for mounting the fastening element on the component surface. This mounting method has the following method steps: provide the above-described cage element, apply adhesive onto the adhesive surface of the first face and/or a component surface of the component arranged opposite the adhesive surface, position the cage element with the adhesive surface on the component surface of the component, cure the adhesive, and install a connecting element in the seat area of the cage element. As already indicated above, different types of adhesive are preferred for fastening the cage element to the component surface. One alternative consists of using a light-sensitive adhesive so that the adhesive is cured by supplying light energy, or a curing process is initiated. For this, the cage element preferably consists of transparent adhesive. Radiated light penetrates through the cage element onto the adhesive surface and the adhesive applied there or on the component in order to start its curing and/or to cure the adhesive. Another embodiment consists of using a heat-sensitive adhesive. This is cured by supplying heat. In this case, the heat can be supplied directly, or heat released from processes occurring in parallel can be used. Moreover, it may be also preferred to supply different types of energy such as light and heat to cure the adhesive. The connecting element is may be installed at different times in the mounting method as explained in greater detail below. According to one embodiment, the connecting element is installed in the cage element before the cage element is adhered. According to another embodiment, the connecting element is first installed in the adhered cage element.

According to another embodiment, the cage element is already provided with a connecting element installed therein. In this context, it is preferred to install the connecting element in the seat area through the installation opening in the second face, or through an opening in the first face before the cage element is adhered to the component surface. According to another alternative, the connecting element is installed in the seat area through the installation opening in the second face after the cage element has been adhered to the component surface. In this way, the time at which the connecting element is arranged in the cage element can be flexibly adjusted in the mounting method. Accordingly, the cage element, or respectively the entire fastening element can therefore be flexibly harmonized with the overall mounting situation. This makes it possible to for example adhere the cage element in a pre-mounted state together with the connecting element on the component surface. In the same way, it is preferable to provide the cage element and connecting element individually for the mounting process. Only during the mounting procedure is the connecting element inserted into the cage element before the cage element is adhered to the component surface. It is also preferred to insert the connecting element into adhered cage elements, or respectively to install or exchange them there after finishing with their mounting. Moreover, the mounting method may comprise the following step while positioning the cage element with the adhesive surface on the component surface: move the wall element out of a position projecting axially beyond the adhesive surface to form a movable collar adjacent to the adhesive surface in the seat area so that the penetration of adhesive into the seat area is prevented.

Moreover, the mounting method may comprise the above-discussed step of curing the adhesive by light, and/or heat, and/or by waiting. Moreover, it is preferred in the context of the mounting method to position the cage element with the adhesive surface adjacent to a component opening. This ensures that the connecting element can be aligned flexibly and precisely with the component opening given its floating arrangement in the seat area of the cage element. Once this alignment is over, an appropriate connecting means can be guided through the component opening in order to be connected there with the connecting element arranged in the seat area. In the context of the mounting method, it is correspondingly preferred to design the connecting element as a nut or threaded sleeve and screw a screw into the connecting element until the plate-like flange of the connecting element lies on the component surface.

A manufacturing method for the cage element is also disclosed. This manufacturing method comprises the following steps: provide a first injection mold for the cage element that preferably has a complementary design with respect to the above-described cage element. The injection molding of the cage element in the first injection mold follows as an additional step, along with demolding the cage element from the first injection mold. According to another embodiment of the present manufacturing method, a second injection mold is provided for the wall element, the wall element is injection molded in the second injection mold, and demolded from the second injection mold.

According to an alternative method, it is preferred to injection mold the movable wall element of the cage element in the first injection mold with the cage element contained therein, in particular with the assistance of a 2 C injection molding method (two-component injection molding method) so that the wall element is fastened to the cage element in a friction lock and/or with the assistance of a plurality of tear-off webs on the cage element. The term "two-component injection molding" covers those methods in which two different types of plastic or plastic modifications are connected with each other by injection molding in a process. "Different plastic modifications" means in this case the same type of plastic, however with deviating fillers such as dyes (multicolor injection molding), reinforcing or fiber material for known plastics such as glass fibers, different size portions of reinforcing material or different, or different portions, of plasticizers. This type of primary forming entails great potential with regard to cost optimization and rationalization, since complex parts with several functional requirements (such as several colors, hard/soft, etc.) can be created in a single step and without significant finishing. In these methods, two different plastics are injected into an injection mold at different times in order to create a part consisting of two components. It is also possible to introduce the same plastic at different times in two or more shots into the injection mold. The components generated by the respective shots are formed in an adjacent arrangement in the injection mold without flowing into each other. In this case, it is also preferable to fill separate cavities in the injection mold at the same time or at different times with the same or different plastics in order to form the aforementioned components. In this case, the plurality of components, here the wall element and cage element, are connected to each other by a plurality of tear-off webs. Tear-off webs denote bar-like bridges between the plastic parts that can be disconnected without the use of machinery due to their small diameter.

Two-component injection molding ensures that the wall element is molded onto the cage element such that it is moved into the cage element under the effect of force, preferably during adhesion. This way of manufacturing effectuates the pre-mounting of the wall element in the cage element to simplify the manufacturing of the cage element or fastening element.

In the context of the manufacturing method, it is moreover also preferred to connect the cage element to the wall element so that the wall element protrudes beyond the first face of the cage element and is friction-locked to the cage element. It is also preferred to insert the connecting element into the cage element through the installation opening, or through a central opening in the first face in the seat area.

4. BRIEF DESCRIPTION OF THE ACCOMPANYING DRAWINGS

The embodiments of the present disclosure are explained in greater detail in reference to the accompanying drawings. In the following:

Figure 1:
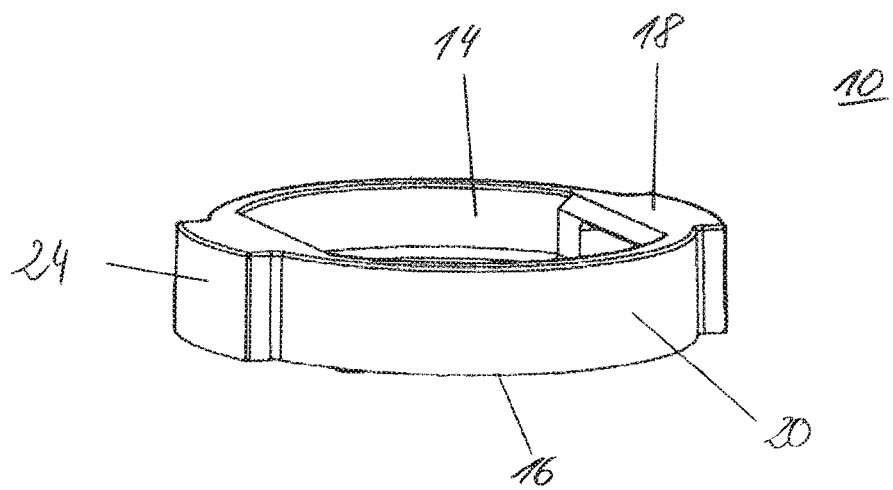
FIG. 1 shows a perspective view of a cage element.
Figure 2:
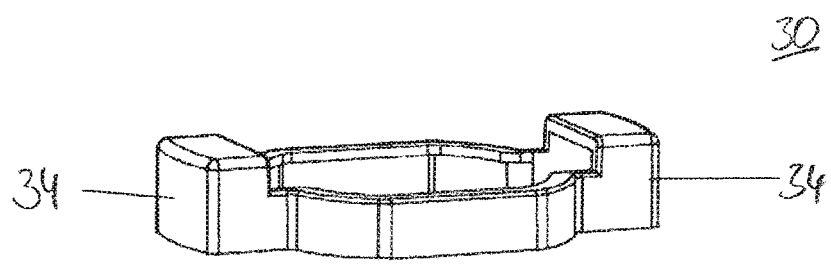
FIG. 2 shows a perspective view of a wall element.
Figure 4:
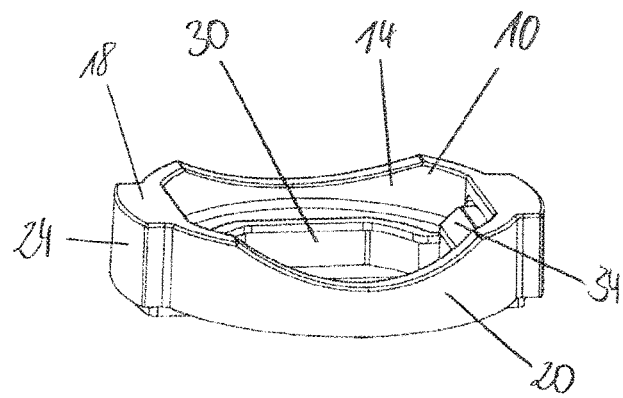
Figure 5:
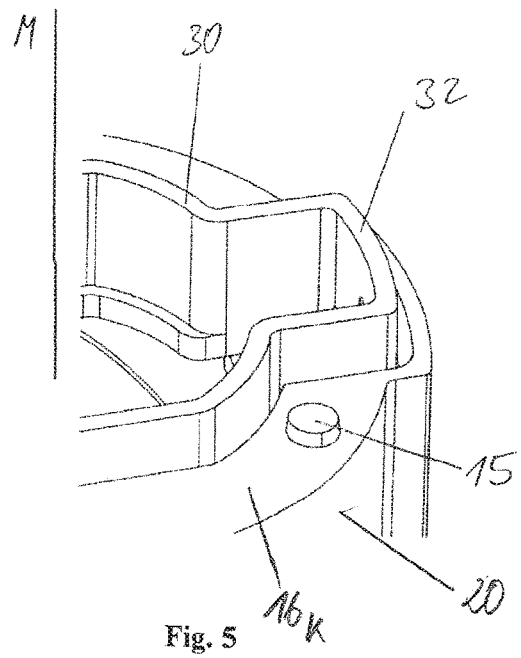
Figure 6:
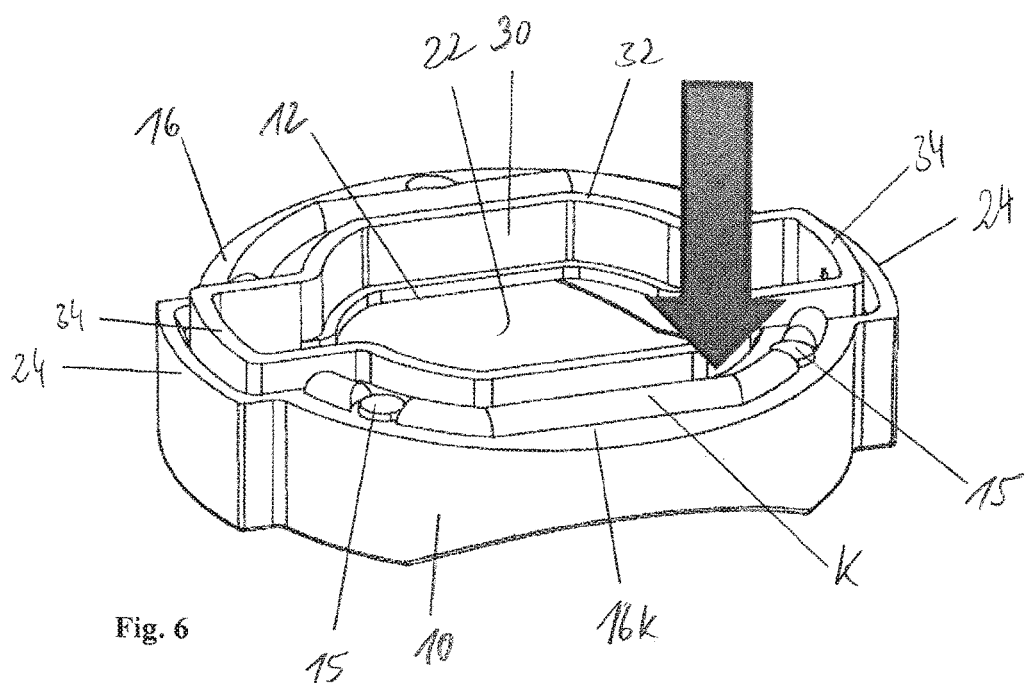
Figure 7A:
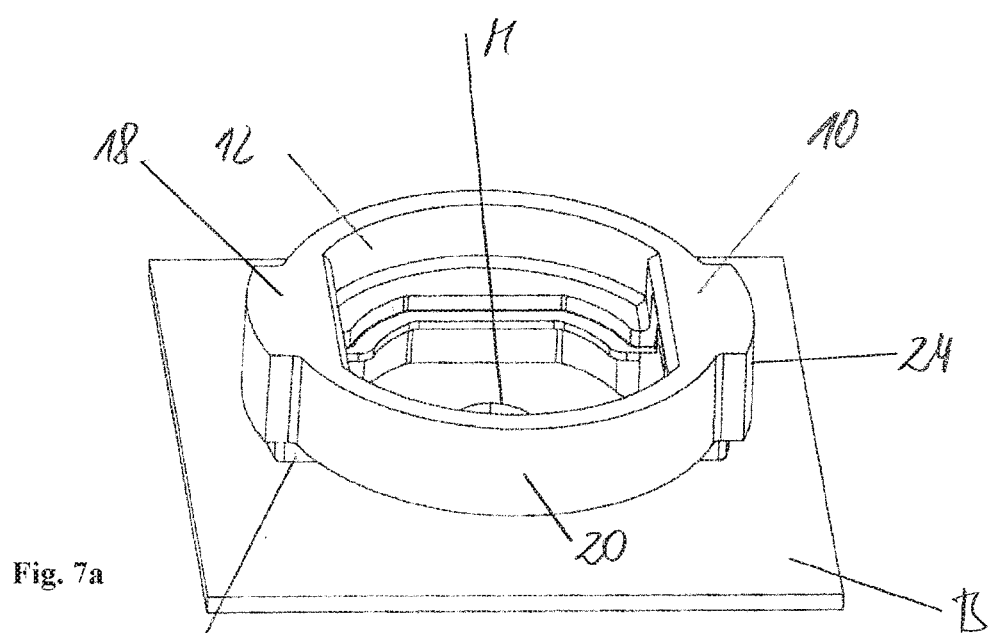
Figure 7B:
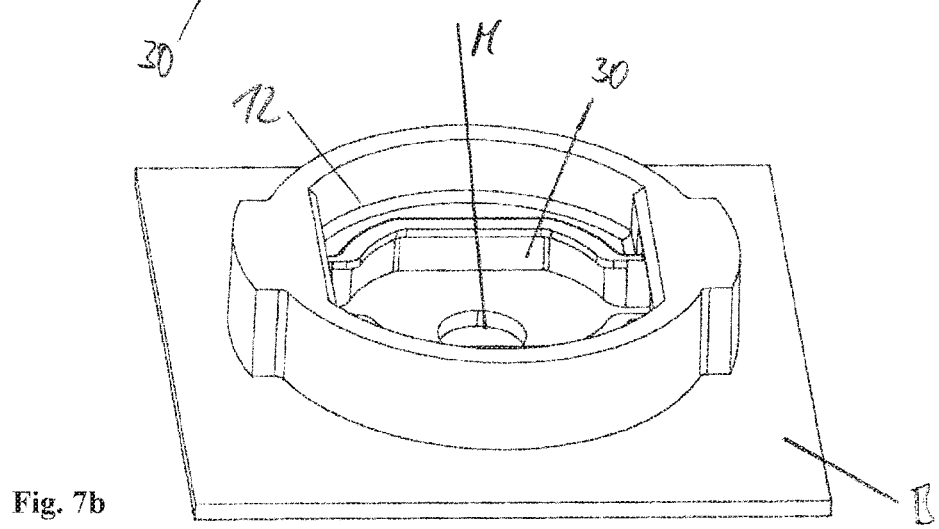
Figure 7C:
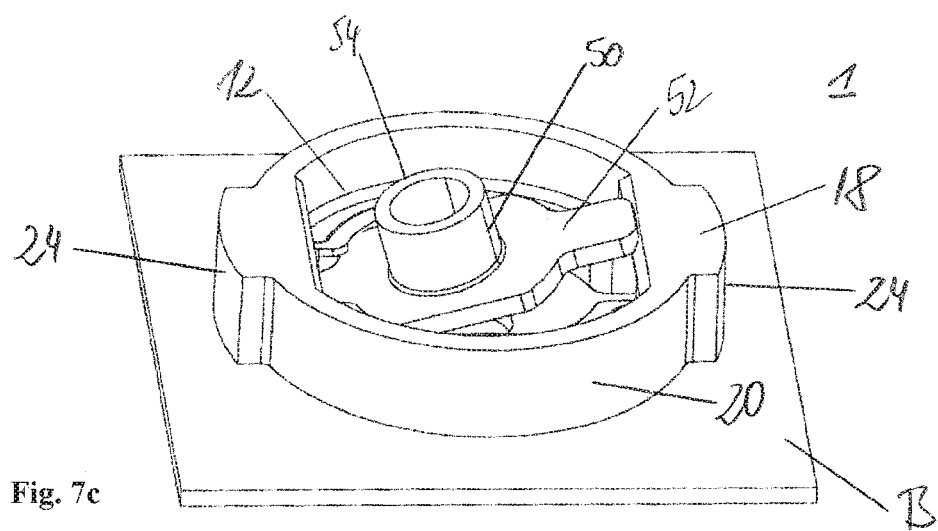
Figure 8:
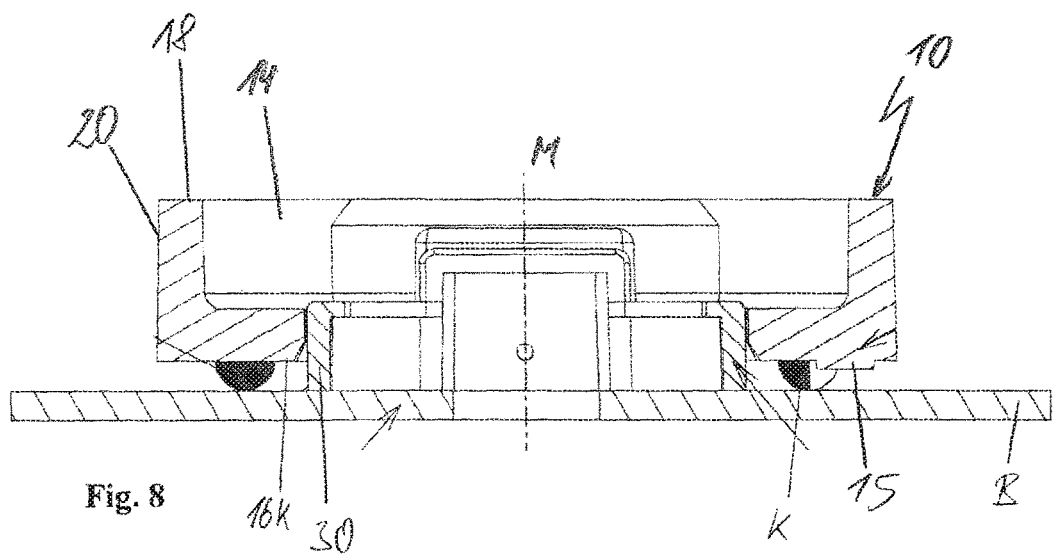
Figure 9:
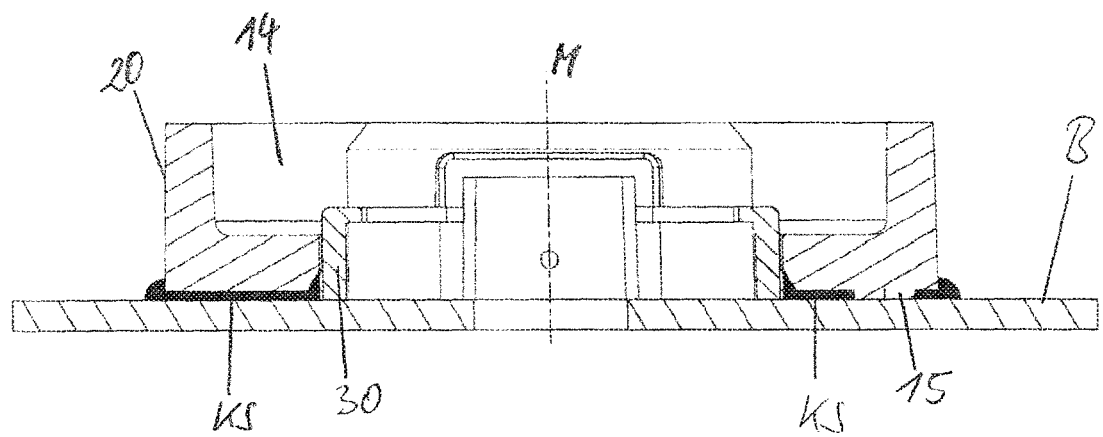
Figure 10:
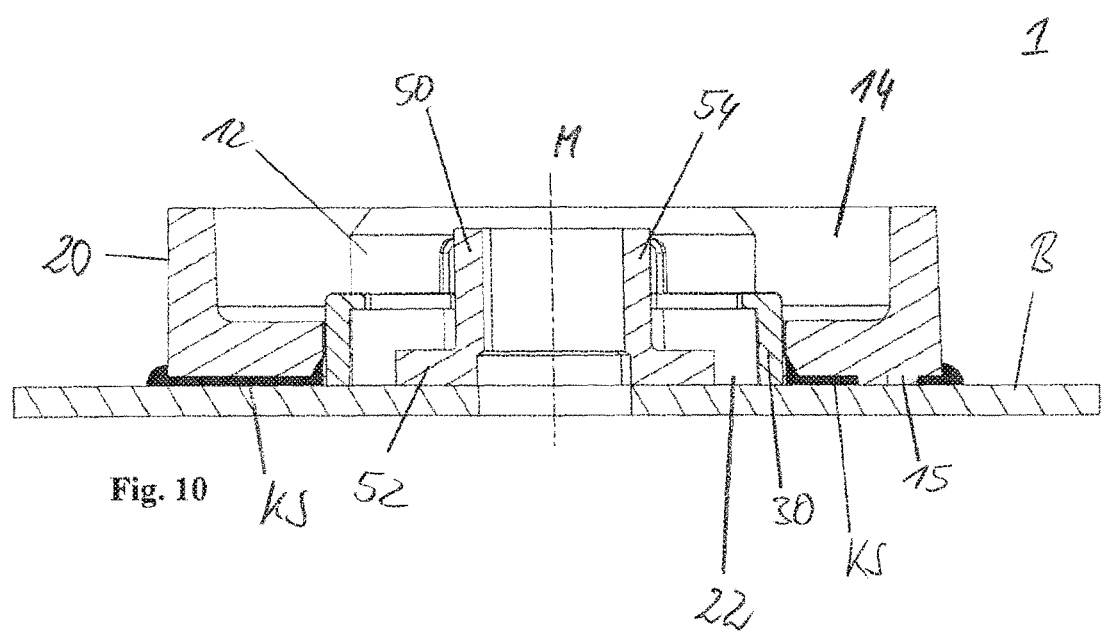
Figure 11:
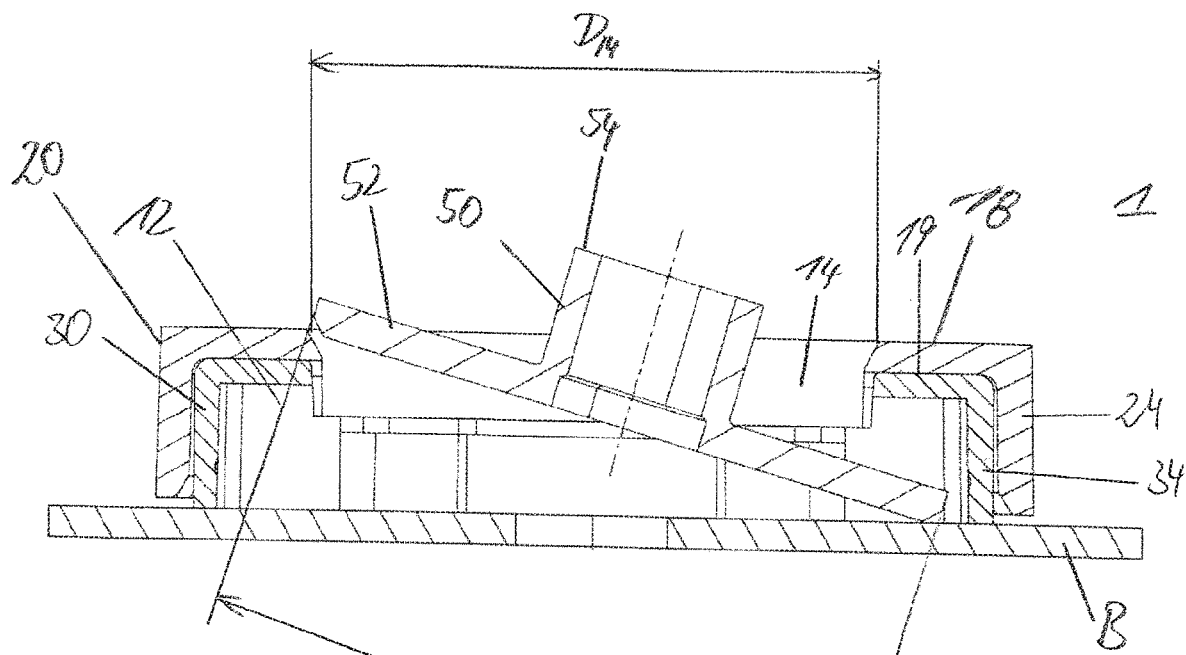
Figure 12:
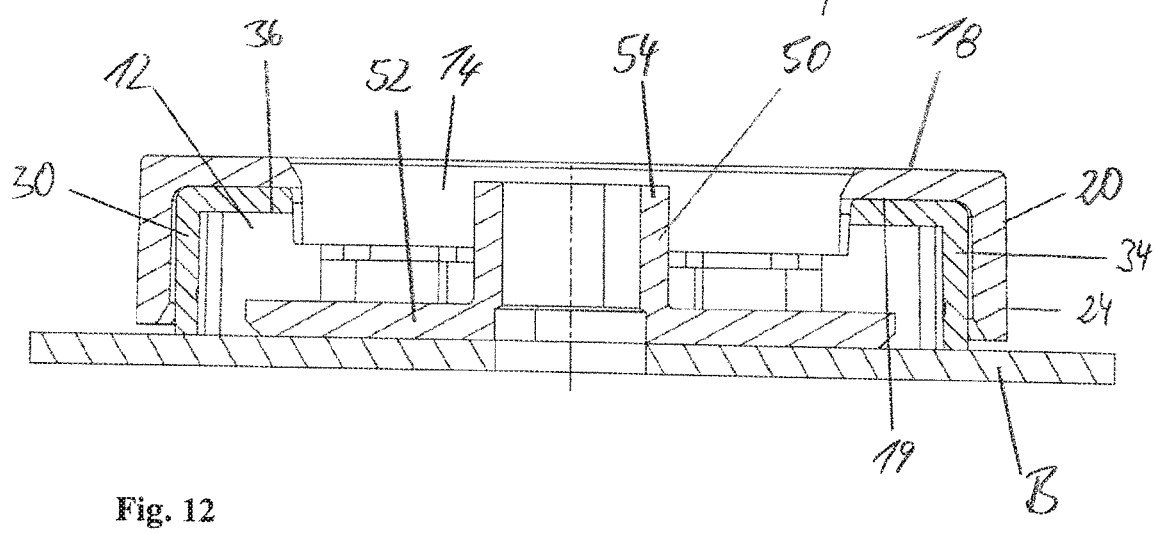
Figure 13:
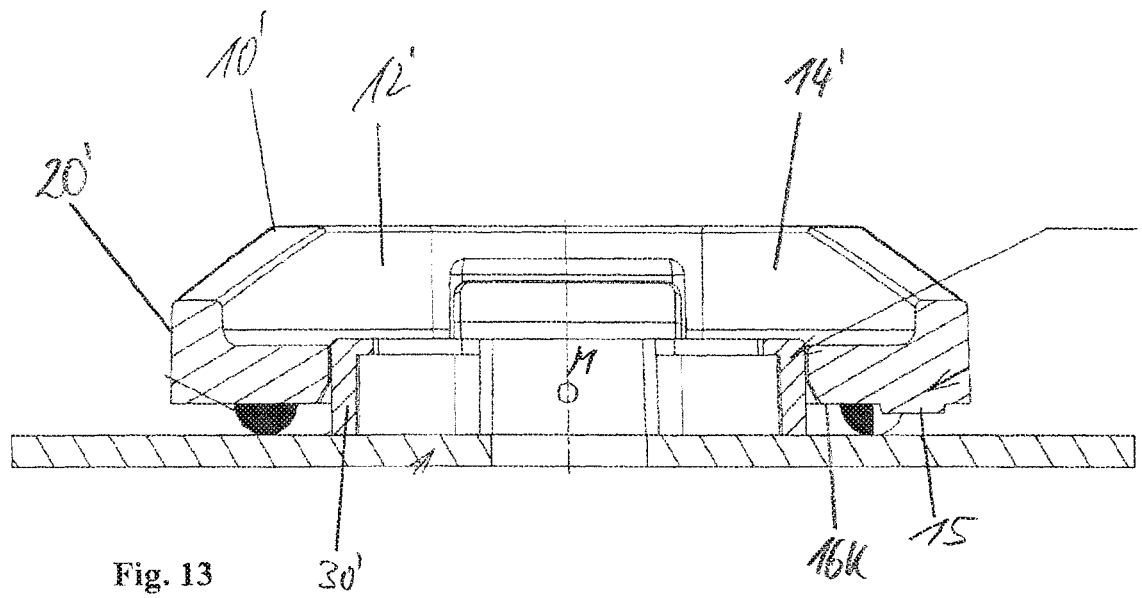
Figure 14:
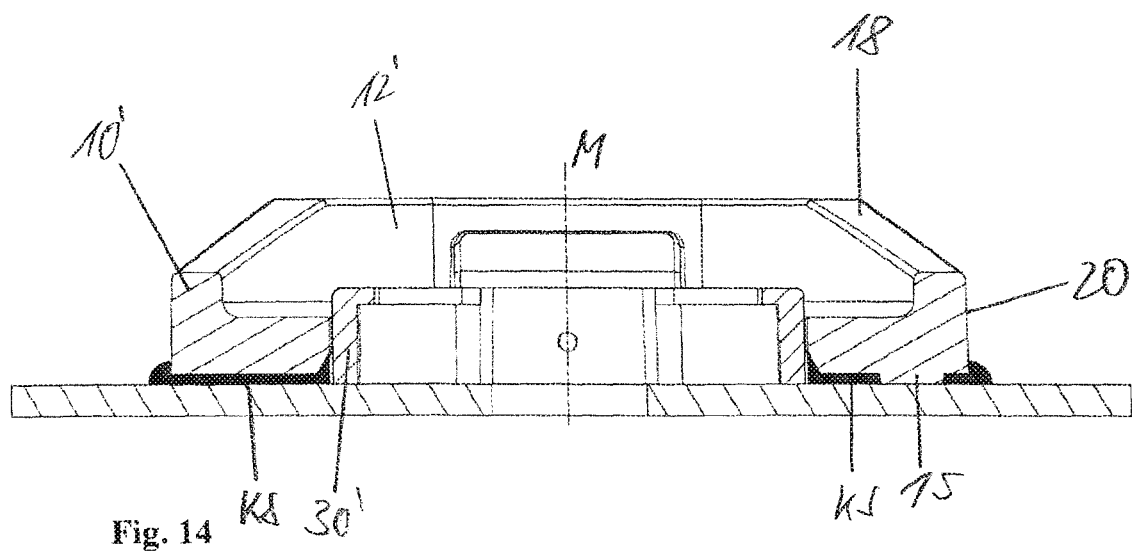
Figure 15:
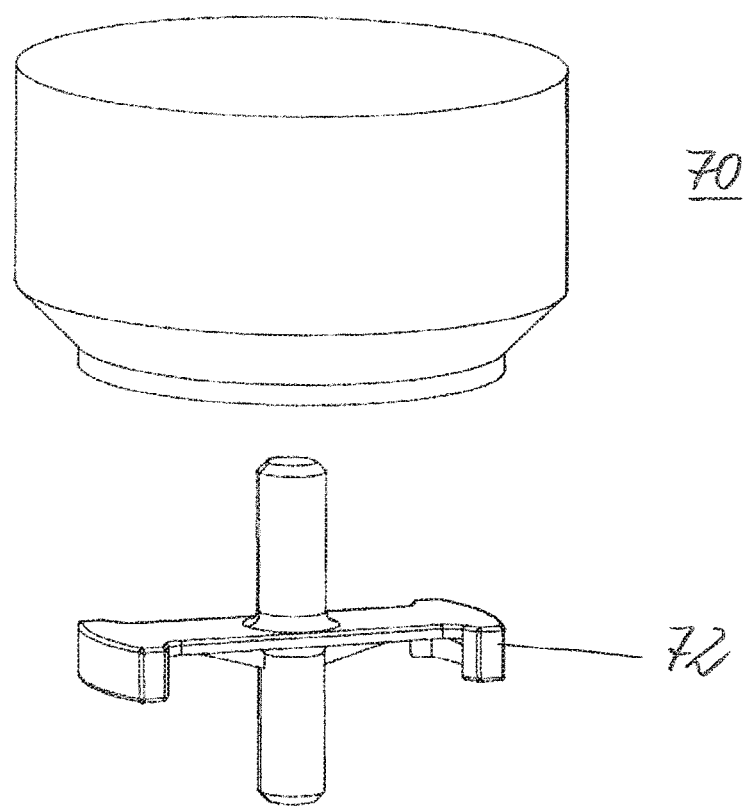
Figure 16:
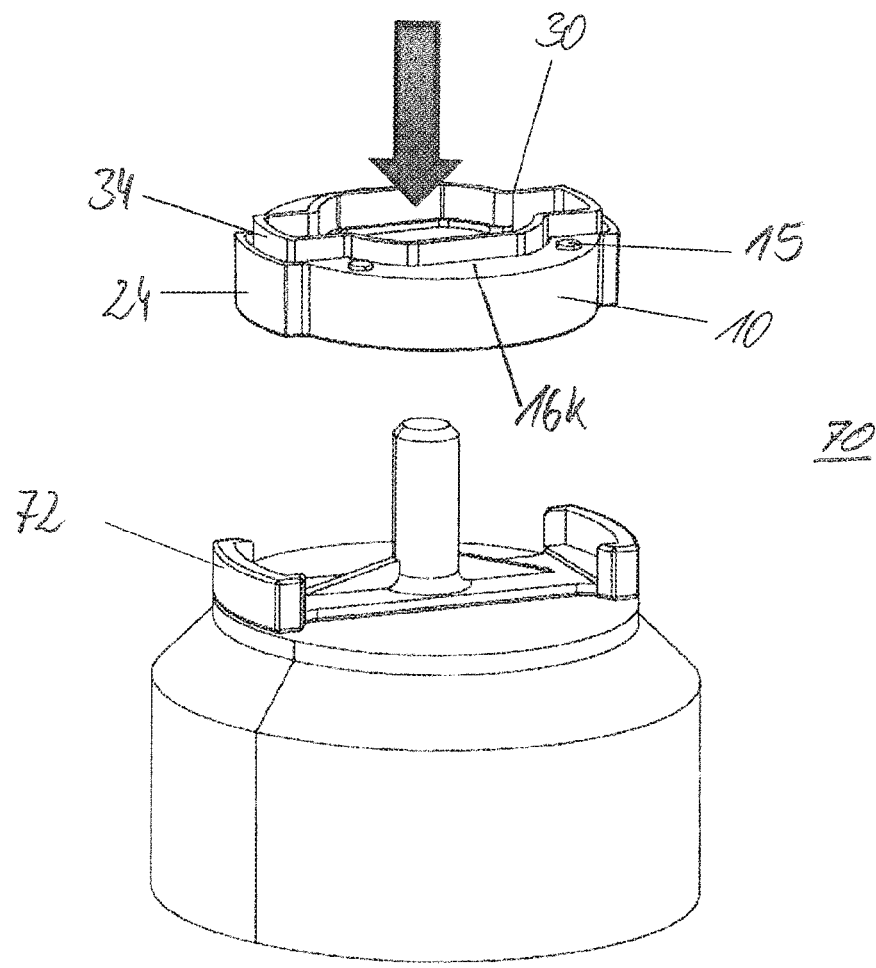
Figure 17:
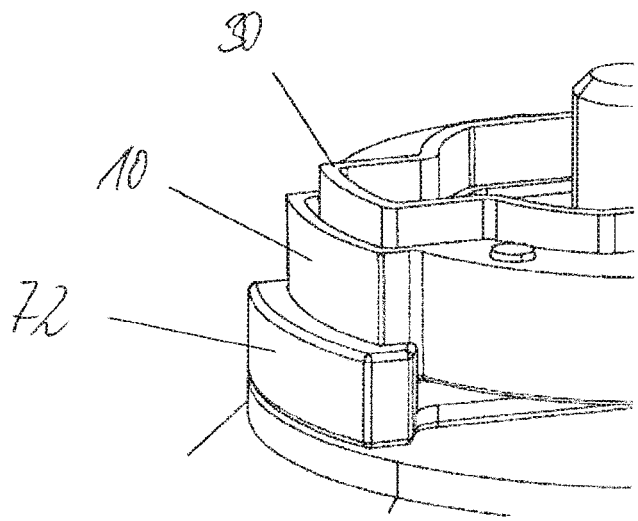
Figure 18A:
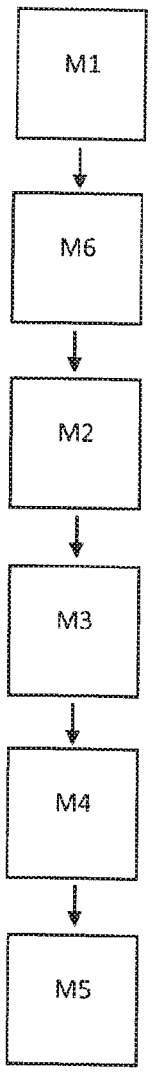
Figure 18B:
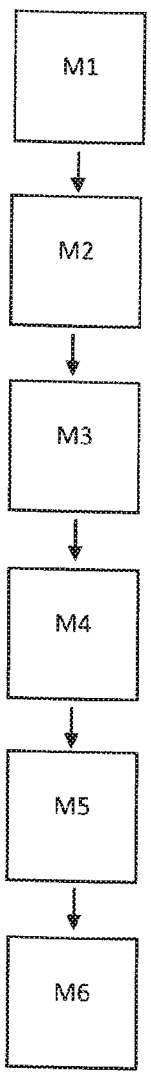
Figure 19:
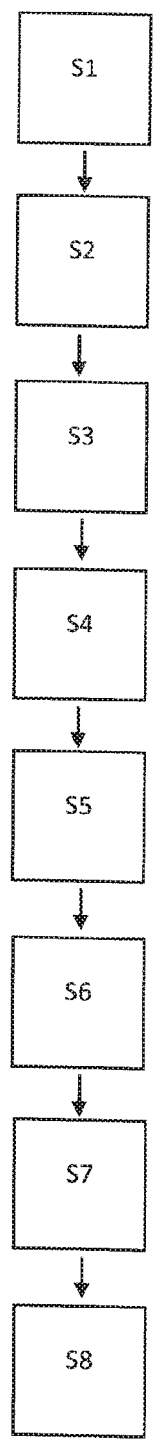

FIG. 4 shows a perspective view of an arrangement of the wall element according to FIG. 2 in a cage element according to FIG. 1, FIG. 5 shows a perspective view of a detail of the adhesive surface of the cage element with a wall element according to FIG. 4, FIG. 6 shows a perspective view of the adhesive surface according to FIG. 5 with the adhesive applied, FIGS. 7a, 7b, 7c show individual sections of the method for mounting the fastening element to the surface of a component, FIG. 8 shows a sectional view of a cage element with a wall element according to FIG. 7a, FIG. 9 shows a sectional view of a age element with a wall element according to FIG. 7b, FIG. 10 shows a sectional view of a cage element with a wall element and installed connecting element similar to FIG. 7c, FIG. 11 shows another sectional view of the cage element with a wall element during the installation of the connecting element in the installation opening, FIG. 12 shows a sectional view of the cage element with a wall element and installed connecting element, FIG. 13 shows another embodiment of the cage element with a wall element in an arrangement that is not yet adhered, FIG. 14 shows the embodiment according to FIG. 13 in an adhered situation on the component surface, FIG. 15 shows a perspective view of a further embodiment of an apparatus for installing the cage element with a wall element on a component, FIG. 16 shows a perspective view of the device according to FIG. 15 prepared for arranging the cage element with a wall element, FIG. 17 shows a detail enlargement of the cage element with a wall element that is installed in the device according to FIG. 15, FIGS. 18A, 18B show two embodiments of the method for mounting the cage element on a component surface as a flowchart, and FIG. 19 shows a further embodiment of the method for manufacturing the fastening element as a flowchart.

5. DETAILED DESCRIPTION

An embodiment of the fastening element 1 is shown in a perspective view in FIG. 7c and in an axial sectional view in FIGS. 10 to 12. It consists of a cage element 10 in which a connecting element 50 is held floatingly in a form-fit in a seat area 12.

The connecting element 50 may consist of a plate-shaped flange 52 and a connecting section 54. The plate-shaped flange 52 has a lateral or radial extension which is adapted to the inner dimensions of the seat area 12. Since the extension of the plate-shaped flange 52 may be slightly larger than a maximum diameter of an installation opening 14 in the cage element 10, the plate-shaped flange 52 is held in a form-fit in the seat area 12. Despite these differences in size, the connecting element 50 can be installed through the installation opening 14 in the seat area 12 as explained in greater detail below.

The connecting section 54 may be designed as a threaded sleeve with an inner thread. According to another embodiment, a bayonet lock or snap lock is provided on the connecting section 54. Also, the connecting section 54 may be a standardized metal nut, a plastic nut, or a hollow cylindrical plastic dome with an inner thread and a thread-reinforcing wire thread insert. Moreover, all of the known fastening options can also be used with which a component can be fastened to another component. To give the connection to be produced sufficient stability, the floatingly arranged connecting element 50 preferably consists of metal or plastic.

The cage element 10 is preferably a ring-like structure produced by means of injection molding as shown in FIG. 1 according to an embodiment of the present invention. It preferably consists of plastic, fiber-reinforced plastic, or a plastic with metal reinforcement. According to another alternative, the cage element 10, 10' consists of metal and is produced by means of diecasting or as a punch-bent part.

The cage element 10 comprises a peripheral boundary wall 20 that connects a first face 16 and a second face 18 to each other. The faces 16, 18 and the boundary wall 20 enclose the aforementioned seat area 12.

An installation opening 14 is provided in the second face 18 through which the connecting element 50 can be installed in the seat area 12. The installation opening 14 also preferably serves for exchanging the connecting element 50 in the seat area 12. For this, the connecting element 50 is removed from the seat area 12 through the installation opening 14, and another connecting element 50 is inserted through the installation opening 14 into the seat area 12. Despite the installation opening 14 in the second face 18 and an opening 22 in the first face 16, the plate-shaped flange 52 of the connecting element 50 can be held in a form-fit in the seat area 12. For this purpose, the lateral, or respectively radial extension of the plate-shaped flange 52 is the same as a diameter of the seat area 12, i.e., the same as the distance between two segments of the boundary wall 20 which are arranged diametrically opposed to each other. Since at least the second face 18 protrudes radially inward beyond the boundary wall 20 into the installation opening 14, the diameter of the installation opening 14 may be less than the lateral extension of the plate-shaped flange 52.

Moreover, it may be preferred to insert the connecting element 50 into the cage element through the opening 22 in the first face 16 in the seat area 12 instead of through the installation opening 14. This is done when the cage element 10 has not yet been adhered to the component. In order to hold the connecting element 50 after being installed through the installation opening 14 or the opening 22 in the cage element 10 when the cage element 10 is in an unadhered state, the detent lugs or retaining bars discussed above are provided which protrude into the seat area 12.

Whereas the cage element 10 shown in FIG. 1 is elliptical-annular, other shapes are also preferred that allow the definition of an inner seat area 12. The peripheral design of the seat area 12' is preferably for example rectangular as shown in FIGS. 13 and 14, or polygonal, triangular, round or elliptical. This shape should be selected in concurrence with the available space on component B.

The first face 16 facing the component B is completely or partially designed as an adhesive surface 16k as illustrated in FIG. 6. An adhesive K may be applied to the adhesive surface 16k in order to fasten the adhesive element 10; 10' to the component surface of the component B. It is also preferred to apply the adhesive K in addition or exclusively on the component surface. In order to support the adhesion of the cage element 10, projections 15 are provided on the adhesive surface 16k. The height of the projections 15 relative to the adhesive surface preferably defines the thickness of the affixing adhesive layer KS that forms during the mounting method between the adhesive surface 16k and the surface of the component B.

In FIGS. 4 to 6, it can be seen that the wall element 30 may be arranged within the seat area 12. The wall element 30 is designed similar to a strip extending around the perimeter that runs parallel to the boundary wall 18 on its radial inside. The wall element 30 is held by a frictional connection to the cage element 10 and therefore can be moved under sufficiently large force parallel to the center axis M of the cage element 10 (see FIG. 5) in the direction of the center axis M. Such a force may be exerted when adhering the cage element 10 or the fastening element 1 to the component B on a face 32 of the wall element 30 facing the component B. Due to this force, the wall element 30 may be moved from a position protruding beyond the adhesive surface 16k into the seat area 12. In this context, the face 32 is preferably moved to a height flush with the preferred projections 15 or with the adhesive surface 16k into the seat area 12. This is clearly discernible in FIGS. 8 to 10, as well as 13 to 14.

In its projecting position (see FIG. 6), the wall element 30 functions as a collar. This collar protects the seat area 12 from the adhesive K on the adhesive surface 16k that is displaced radially inward while adhering to the component B. Since the wall element 30 executes an analogous counter movement to the placement, or respectively adhering movement of the cage element 10 during adhesion, the seat area 12 is shielded from the adhesive K over the entire adhering phase by the collar effect of the wall element 30.

In adapting to the shape of the cage element 10, the external form of the wall element 30 is designed annular, circular, elliptical, polygonal or the like.

It is also preferred to configure the wall element 30 in another design than the cage element 10. It must only be ensured that the wall element 30 is held on the radial inside of the cage element 10 in a friction lock, or is otherwise movable in a controlled manner. Moreover, in a manner similar to the above-described embodiments, it must be ensured that the seat area 12 and in particular the connecting element 50 is shielded from the adhesive K. Accordingly, it would also be within the scope of the present invention if the area enclosed by the wall element 30 were just large enough to seat the connecting element 50, preferably its plate-shaped flange 52. For this, the cage element 10 can extend in another form and size around the wall element 30.

As already explained above, the connecting element 50 is held in a form-fit manner and floatingly in the seat area 12. "Floatingly" in this context means that the connecting element 50 can execute certain lateral and/or axial movements within the seat area 12. This ensures easy and precise alignment of the connecting element 50 with the component opening and a connecting means protruding therethrough, such as a threaded bolt.

The installation opening 14 in the second face 18 of the cage element 10 may be equipped with a maximum diameter $D_{14}$. Even if the maximum diameter $D_{14}$ varies due to the shape of the installation opening 14, it is always smaller than a lateral extension $A_{52}$ of the plate-shaped flange of the connecting element 50. This ensures the form-fit seating of the connecting element 50 in the seat area 12. In order to be able to still install the connecting element 50 through the installation opening 14 in the seat area 12, the cage element 14 and preferably the wall element 30 as well preferably comprise at least one radial pocket or bulge 24, 34, may be two pockets that are diametrically opposed to each other. Alternative to the pockets 24 but in a similar constructive arrangement as in FIG. 11, it is also preferred for the second face 18 to also partially cover the seat area 12 without pockets before it is penetrated by the installation opening 14. With its bottom side 19 alone, or in combination with the wall element 30, this covering second face 18 provides sufficient retention for the fastening flange 52 of the connecting element 50. With an oblique arrangement of the connecting element 50 (see FIG. 11) in relation to the second face 18 facing away from the component, the radial depth of the pocket 24, 34 enlarges the installation opening 14 by at least the difference between the diameter of the installation opening 12 and the lateral extension $A_{52}$ of the plate-shaped flange 52. Thus, in an oblique arrangement, the connecting element 50 can be installed, or respectively threaded into the seat area 12. Since the plate-shaped flange 52 is arranged parallel to the installation opening 14 when the fastening element 1 is in an installed state and in a normal alignment determined by gravity, the connecting element 50 cannot be accidentally removed from the seat area 12.

According to another embodiment, the lateral extension of the fastening flange 52 is only slightly larger than the installation opening 14. If the fastening flange 52 is placed on the installation opening 14 and it is then pressed through the installation opening 14, then the fastening flange may snap into the seat area 12. This snapping-in that is supported by a resilient flexibility of at least one of the ends of the fastening flange 52 arranged radially on the outside can be supported by bevels 14s on the edge of the installation opening 14, and adjacent in the second face 18. The bevels 14s are discernible in FIGS. 1, 7, 11 and 12. If the connecting element 50 is unlatched or snapped out of the seat area 12 by reversing the above-described installation by snapping in, then bevels are also provided adjacent to the bottom side 19 and installation opening 14.

Furthermore, the option exists of inserting the connecting element 50 through the opening 22 in the first face 16 before the cage element 10 is adhered. After the connecting element 50 has been installed in the seat area 12, the plate-shaped flange 52 is preferably held by the bottom side 19 of the second face 18. It is also preferable for the connecting element 50 to be held by a bottom side 36 of a face 35 of the wall element 30. The embodiment of the wall element 30 with a face 35 running parallel to the second face 18 is however optional since the primary function of the wall element 30 consists of shielding the seat area 12 from adhesive. According to another embodiment, the cage element 10 and/or the wall element 30 has a plurality of detent lugs (not shown) that extend radially inward into the seat area 12. These detent lugs are elastically deformable so that the detent lugs can be overcome by the flange 52 when inserting the connecting element 50 through the opening 22. Then, the connecting element 50 is floatingly held between the second face 18 and the detent lugs in the seat area 12. In the same manner, a connecting element 50 may be held that has been inserted through the installation opening 14 in the seat area 12. With the assistance of the detent lugs, it is also preferably possible to provide the fastening element 1 consisting of the cage element 10, wall element 30 and connecting element 50 as a pre-assembled unit. Alternatively to the detent lugs, a peripheral retaining bar or a plurality of retaining bars (not shown) that are arranged peripherally can also be preferably used. These protrude in the same manner as the aforementioned detent lugs into the seat area 12 and prevent the connecting element 50 from falling out of the seat area 12 whether or not it has been inserted thereinto through the installation opening 14 or the opening 22.

Figure 3:
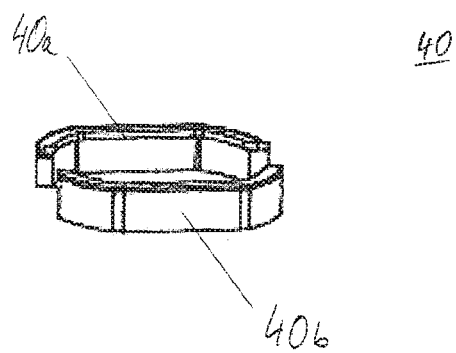
FIG. 3 shows a perspective view of a reinforcing element.

With regard to FIG. 3, the preferred embodiment of an additional support element 40 is shown. This additional support element 40 consists of a rigid material such as metal, fiber-reinforced plastic, or the like. It serves to stabilize the combination consisting of the boundary wall 20 and wall element 30, or only to stabilize the wall element 30. If the connecting element 50 is for example designed as a nut, then the flange 52 braces against the radial inside of the wall element 30, preventing the nut 50 from also turning when a threaded bolt is screwed into the nut 50. In order to resist these forces, the wall element 30 must be designed sufficiently stable, or supported by the additional support element 40. Correspondingly, it is preferred to design the additional support element 40 as a clamp with two legs (not shown), as a peripheral support element, or as two additional support elements 40*a*, 40*b* (FIG. 3) that fit each other. The additional support element 40 is preferably arranged between the boundary wall 20 and wall element 30. According to another alternative, the additional support element 40 is arranged on a radial inner side of the wall element 30. In this case, the additional support element 40 is preferably held by a friction lock or an adhesive connection. It is also preferred to embed the additional support element 40 in the wall element 30.

It is furthermore preferred to mount the cage element 10 in combination with a wall element 30 with the assistance of a manual mounting device 70 or a robot in combination with this mounting device 70. The mounting device 70 is schematically shown in FIG. 16. The mounting device 70 possesses a holding device 72 in which the cage element 10 can be clamped. Preferably, the cage element 10 is fastened by means of a light-sensitive adhesive K, and/or a heat-sensitive adhesive K to the component surface. For this, the mounting device 70 comprises a corresponding light and/or heat source.

According to one of the above-described embodiments, after the cage element 10 has been provided in a first step M1, the adhesive K is applied to the adhesive surface 16*k* and/or a component surface in step M2. The application of the adhesive in step M2 can occur before or after the cage element 10 has been arranged in the holding device 72 of the mounting device 70. Then the cage element 10 is positioned with the adhesive surface 16*k* on the component surface of the component B in step M2. When pressing the cage element 10 onto the component surface, the wall element 30 is shifted in step M3 from the position axially projecting beyond the adhesive surface 16*k* into the seat area 12 to prevent the entrance of adhesive K into the seat area 12 during this procedure. During this movement, the tear-off webs between the cage element 10 and wall element 30 may be disconnected so that the position of the wall element 30 can be changed. After the cage element 10 has been appropriately positioned, the adhesive K is cured by light and/or heat, and/or by waiting, and/or additional pressure on the adhesive surface in step M5.

During the mounting method, it may be preferred to install the connecting element 50 in the seat area 12 after the cage element 10 has been adhered to the component surface (step M6 in the alternative method in FIG. 18B). In the same manner, it is also preferred to arrange the connecting element 50 in the seat area 12 through the opening 22 in the first face 16 or through the installation opening 14 in the second face 18 before adhering the cage element 10 on the component surface (step M6 in the alternative method in FIG. 18A). After the cage element 10 has been may be positioned and fastened with the adhesive surface 16*k* adjacent to the component opening, a screw, or a threaded bolt, or another appropriate connecting means is fastened in the connecting element 50, especially screwed in, until the connecting element 50 lies on the component surface. Especially, the combination of a nut with a fastening flange and a threaded bolt is used. In this case, the nut preferably consists of metal, plastic, fiber-reinforced plastic, or it is composed of a plastic dome with a threaded insert, or a plastic sleeve with a wire thread insert reinforcing the inner thread. An example of the sequence of the mounting method is explained summarily in the flow chart 18.

As already shown above, the cage element 10 as well as the wall element 30 are manufactured with the assistance of an injection molding method. To this end, a first injection mold is provided for the cage element 10 in step S1. The cage element 10 is injection molded in the first injection mold in step S2, wherein the cage element 10 is demolded from the first injection mold in step S3. According to step S4, a second injection mold is provided to produce the wall element 30. After the wall element 30 has been injection molded in the second injection mold (step S5), the wall element 30 is also demolded from the injection mold (step S6). Then in step S7, the cage element 10 and wall element 30 are connected to each other such that the wall element 30 protrudes beyond the first face 16 of the cage element 10 and is friction-locked to the cage element 10.

It may be also preferred to produce the cage element 10 in combination with the wall element 30 in a 2 C injection molding method. In this case, the cage element 10 and the wall element 30 are sequentially produced in a combined mold, or respectively an appropriate injection mold with two different shots of material which can consist of different plastics or the same plastic. According to this manufacturing method, the cage element 10 and the wall element 30 are arranged positionally correct and more or less pre-mounted. The necessary relative mobility between the cage element 10 and the wall element 30 when mounting and adhering the cage element 10 on the component surface is realized by connecting webs (not shown) that can be torn off between the cage element 10 and wall element 30. It may be also preferred to connect the cage element 10 and the wall element 30 only by an adhesive connection (adhesion) of the second material shot for the wall element 30 on the cage element 12. For this, it is necessary for the first material shot for the cage element 12 to already be sufficiently cooled so that cohesion is no longer possible between the cage element 10 and wall element 30.

According to a further embodiment of the present production method, the cage element 10 is transported in combination with the wall element 30 as bulk material in order to then be fastened to a component surface. After being fastened to the component surface, the connecting element 50 is then inserted into the cage element through the installation opening 14. It is also preferred to insert the connecting element 50 into the cage element 10 before transporting the cage element 10 in combination with wall element 30. This insertion can be accomplished both through the installation opening 14 as well as through the opening 22 in the first face 16. In the same manner, it may be preferred to arrange the connecting element 50 in the cage element 10 through the installation opening or through the opening in the first face 16 shortly before the cage element 10 is fastened as a fastening element 1 to the component surface. A summary of the production method is in the flow chart in FIG. 19.

The invention claimed is:

1. A cage element for a fastening element having the following features:
 a. a first and a second face arranged opposite each other which are connected to each other by a peripheral boundary wall in order to define a seat area for a connecting element,
  a1. the first face at least partially forms an adhesive surface for fastening the cage element to a component,
  a2. the second face has an installation opening for the connecting element, wherein
 b. the connecting element can be seated in the seat area through the installation opening and held there floatingly in a form-fit manner,
 c. a wall element is shiftably arranged in the seat area of the cage element, and at least partially radially adjacent to the boundary wall, in which
 d. the wall element is movable perpendicular to the adhesive surface between a position that projects axially beyond the first face and a position seated in the seat area.

2. The cage element according to claim 1 in which the wall element in the projecting position forms a movable collar adjacent to the adhesive surface that prevents the penetration of adhesive into the seat area.

3. The cage element according to claim 2, in which the seat area has at least one radial bulge by which the connecting element can be inserted through the installation opening.

4. The cage element according to claim 2, in which the connecting element is a threaded sleeve with an asymmetrical, plate-like end face.

5. The cage element according to claim 2, in which the cage element consists of transparent plastic.

6. The cage element according to claim 2, in which the wall element consists of metal or plastic so that the boundary wall is stabilized.

7. The cage element according to claim 2 in which the wall element is held in a friction-locked fit adjacent to the boundary wall.

8. The cage element according to claim 2, in which the adhesive surface has a plurality of projections which serve as spacers to a component surface.

9. The cage element according claim 1, in which the seat area has at least one radial bulge by which the connecting element can be inserted through the installation opening.

10. The cage element according to claim 9, in which the connecting element is a threaded sleeve with an asymmetrical, plate-like end face.

11. The cage element according to claim 9, in which the cage element consists of transparent plastic.

12. The cage element according to claim 1, in which the connecting element is a threaded sleeve with an asymmetrical, plate-like end face.

13. The cage element according to claim 1, in which the cage element consists of transparent plastic.

14. The cage element according to claim 1, in which the wall element consists of metal or plastic so that the boundary wall is stabilized.

15. The cage element according to claim 1 in which the wall element is held in a friction-locked fit adjacent to the boundary wall.

16. The cage element according to claim 1, in which the adhesive surface has a plurality of projections which serve as spacers to a component surface.

17. A fastening element that has the following features:
 a. a cage element according to claim 1, and
 b. the connecting element that can be seated in the seat area through the installation opening in the second face, or through an opening in the first face, and that is held floatingly in a form-fit manner in the seat area.

18. A component with a component opening on which an adjacent cage element is adhered to a component surface, wherein the cage element includes:
 a. a first and a second face arranged opposite each other which are connected to each other by a peripheral boundary wall in order to define a seat area for a connecting element,
  a1. the first face at least partially forms an adhesive surface for fastening the cage element to a component,
  a2. the second face has an installation opening for the connecting element, wherein
 b. the connecting element can be seated in the seat area through the installation opening and held there floatingly in a form-fit manner, and
 c. a wall element is shiftably arranged in the seat area of the cage element, and at least partially radially adjacent to the boundary wall, in which
 d. the wall element is movable perpendicular to the adhesive surface between a position that projects axially beyond the first face and a position seated in the seat area.

19. The component of claim 18 which also includes the connecting element seated in the seat area through the installation opening in the second face, or through an opening in the first face, and that is held floatingly in a form-fit manner in the seat area.

* * * * *